(12) United States Patent
Beckman

(10) Patent No.: US 6,307,746 B1
(45) Date of Patent: Oct. 23, 2001

(54) POWER ADAPTER HAVING A THERMAL COOLING ASSEMBLY FOR A DIGITAL INFORMATION APPLIANCE

(75) Inventor: Jerry L. Beckman, Elk Point, SD (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/455,891

(22) Filed: Dec. 6, 1999

(51) Int. Cl.⁷ .......................................... H05K 7/20
(52) U.S. Cl. ..................... 361/687; 361/695; 361/700; 363/141
(58) Field of Search ................... 361/687, 690, 361/695, 700; 363/125, 141, 146

(56) References Cited

U.S. PATENT DOCUMENTS

| | | | |
|---|---|---|---|
| 4,383,286 * | 5/1983 | Hicks ..................................... | 361/687 |
| 4,928,220 | 5/1990 | White ..................................... | 363/56 |
| 5,270,902 | 12/1993 | Bellar et al. ........................... | 361/718 |
| 5,283,715 | 2/1994 | Carlsten et al. ....................... | 361/702 |
| 5,285,108 | 2/1994 | Hastings et al. ...................... | 257/712 |
| 5,285,347 | 2/1994 | Fox et al. .............................. | 361/385 |
| 5,323,847 | 6/1994 | Koizumi et al. ................. | 165/104.33 |
| 5,349,823 | 9/1994 | Solomon ................................ | 62/6 |
| 5,365,749 | 11/1994 | Porter .................................. | 62/259.2 |
| 5,383,340 | 1/1995 | Larson et al. ........................ | 62/259.2 |
| 5,636,112 | 6/1997 | Faulk ..................................... | 363/48 |
| 5,703,536 | 12/1997 | Davis et al. .......................... | 330/289 |
| 5,815,370 | 9/1998 | Sutton .................................. | 361/699 |
| 5,860,280 | 1/1999 | Recine, Sr. et al. ................. | 62/3.64 |
| 5,864,466 | 1/1999 | Remsburg ............................ | 361/700 |
| 5,880,929 | 3/1999 | Bhatia .................................. | 361/687 |
| 5,898,569 * | 4/1999 | Bhatia .................................. | 361/700 |

OTHER PUBLICATIONS

New Panasonic Toughbook Press Relaease, 5/99.

* cited by examiner

*Primary Examiner*—Jeffrey Sterrett
(74) *Attorney, Agent, or Firm*—Suiter & Associates PC; Kevin E. West

(57) ABSTRACT

A power adapter for a digital information appliance includes an integral thermal cooling assembly for providing supplemental cooling to electronic components within the digital information appliance. The power adapter is comprised of a power supply suitable for conditioning electrical power supplied to the digital information appliance from an external source, a thermal cooling assembly and a coupling assembly capable of operably coupling power adapter to the digital information appliance. The thermal cooling assembly is suitable for providing cooling to the digital information appliance while the power adapter is operably coupled thereto by the coupling assembly.

41 Claims, 7 Drawing Sheets

POWER ADAPTER HAVING A THERMAL COOLING ASSEMBLY FOR A DIGITAL INFORMATION APPLIANCE

FIELD OF THE INVENTION

The present invention relates generally to the field of digital information appliances, and more specifically to methods and apparatus for providing thermal cooling to a digital information appliance.

BACKGROUND OF THE INVENTION

The reliability and performance of digital information appliances, in particular portable ("laptop" or "notebook") computers, are closely related to the temperature at which the device's internal electrical and electronic components operate. For example, a typical portable computer includes a number of internal electrical and electronic components mounted on one or more circuit boards supported within the computer's housing. During periods of heavy use, these components may generate excess heat that must be dissipated outside of the appliance to prevent damage to the computer or degradation of its performance. However, the desirability of providing compact size in portable computers necessitates the consideration of alternate cooling methods typically not utilized in "desktop" computer systems due to limited space within the portable computer's housing for adequate cooling apparatus (heat sinks, cooling fans, and the like).

The problem of providing sufficient cooling to portable digital information appliances is greatly magnified by the increasing use of higher-powered components that generate greater amounts of heat. For instance, as portable computers have evolved, they have continually employed faster and more powerful processors that consume increasing amounts of power from the computer's battery during operation. As a result, the speed of processors utilized by portable computers has been somewhat limited by the necessity of providing adequate battery life for portable operation. Faster processors also generate more heat than their slower predecessors further limiting their use. In addition, faster processors also make other devices in the portable computer fun faster, generating even more heat, contributing to further increases in temperature.

One method of overcoming these shortcomings and improving the maximum performance of processors utilized in portable computers is to reduce the speed of the processor while the computer is powered by its battery. When external power is provided the processor is allowed to operate at a higher speed. However, when the processor is operated at the higher speed, it typically produces a greater amount of heat thus necessitating the use of larger cooling apparatus such as heat sinks, cooling fans and the like, than would be required while the processor operates at the slower speed. The use of larger cooling apparatus increases the portable computer's size and weight, and in the case of cooling fans, when operated without external power, consumes additional power that unnecessarily reduces its battery life. Consequently, it becomes desirable to provide supplemental cooling to the digital information appliance while operating on external power (i.e., while its processor is operating at a higher speed).

For this purpose, external docking stations have been developed that include cooling apparatus for providing supplemental cooling to the portable computer while docked therein. However, such docking stations are optional and not always purchased with every portable computer. Further, docking stations, like "desktop computers" are stationary, and thus cannot provide supplemental cooling when the portable computer is operated portably (e.g., operated at remote locations using external power so that operation of the processor at the higher speed is desirable). Further, larger cooling apparatus, such as cooling fans or the like, contained within the portable computer or docking station often produce excessive noise during operation which may become distracting to the user. Finally, docking stations, while often employed with portable computers, may not be suitable for use with other types of digital information appliances.

As a result, it is desirable to provide apparatus capable of furnishing supplemental cooling to a digital information appliance capable of being operated portably at remote locations. Such an apparatus may further be physically separated from the digital information appliance so that any noise it generates is less perceptible to the user.

SUMMARY OF THE INVENTION

Accordingly, the present invention is directed to a power adapter for a digital information appliance having an integral thermal cooling assembly for providing supplemental cooling to electronic components within the digital information appliance. The power adapter is comprised of a power supply suitable for conditioning electrical power supplied to the digital information appliance from an external source, a thermal cooling assembly and a coupling assembly capable of operably coupling power adapter to the digital information appliance. The thermal cooling assembly is suitable for providing cooling to the digital information appliance while the power adapter is operably coupled thereto by a coupling assembly.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 17, an exemplary digital information appliance system employing the present invention is shown. The digital information appliance system 100 is comprised of a digital information appliance 102 having a removable power adapter 104 suitable for providing conditioned electrical power to the digital information appliance from an external source 106. In this manner, electrical power may be provided to the digital information appliance 102 for its operation and/or charging of an internal power supply such as a battery.

Figure 1:
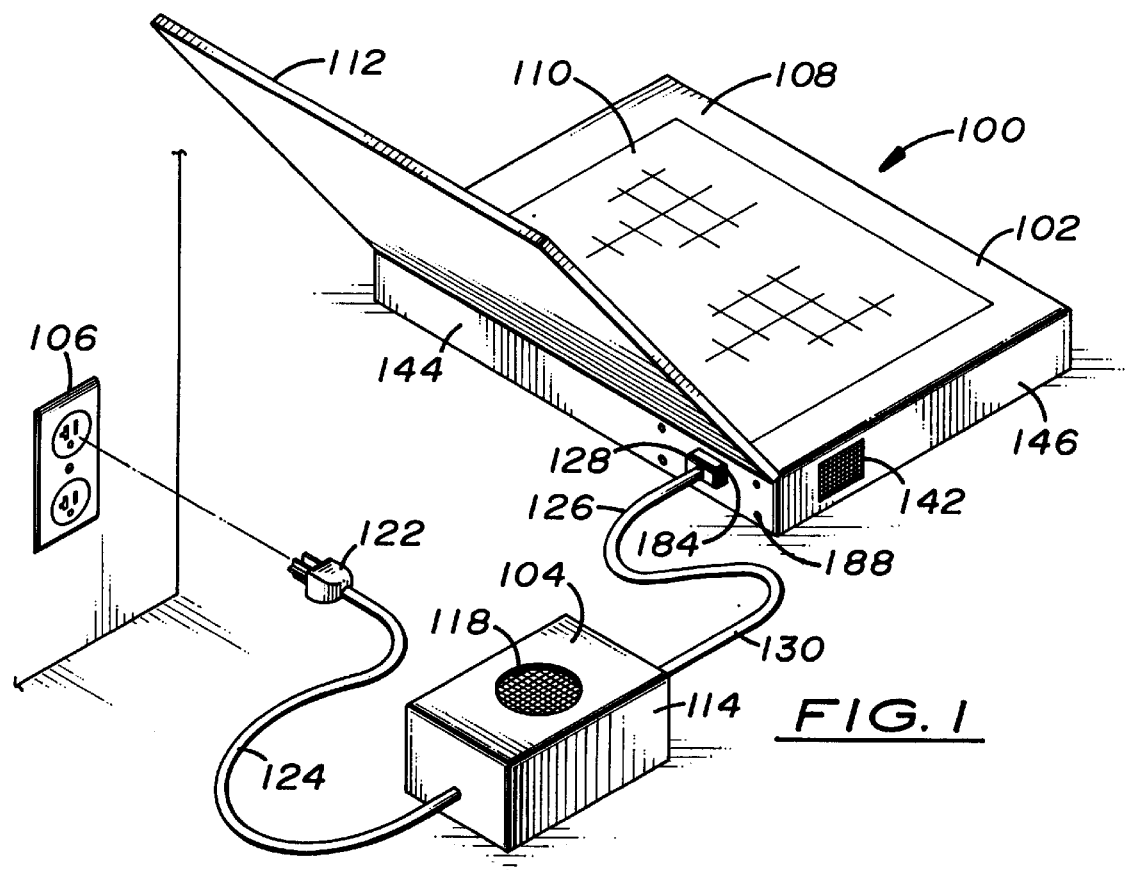
FIG. 1 is an isometric view depicting a digital information appliance system employing a power adapter having an integral thermal cooling assembly in accordance with an exemplary embodiment of the present invention.
Figure 14:
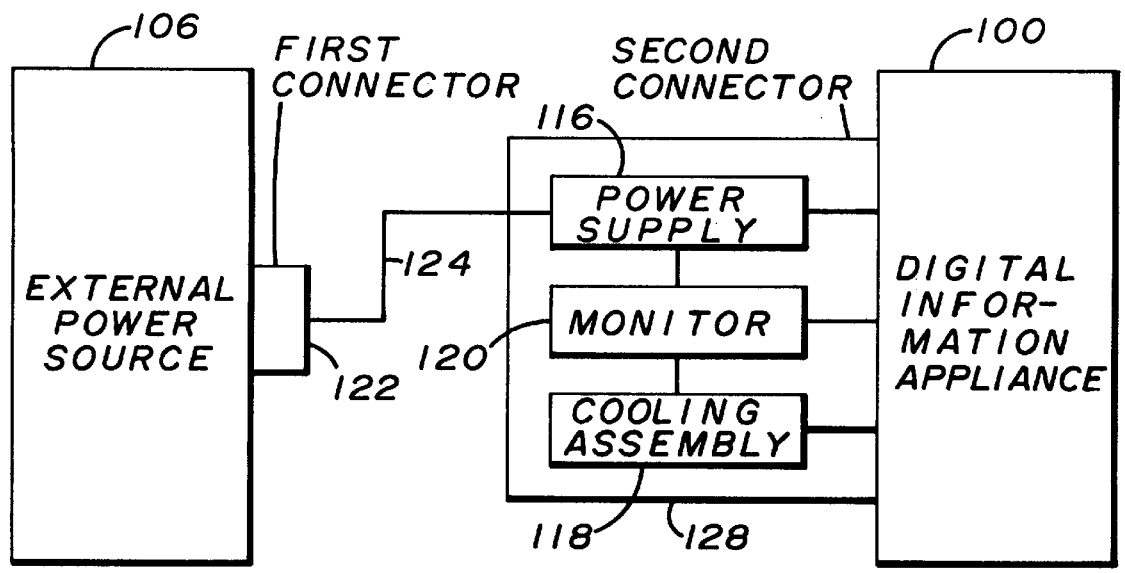
FIG. 14 is an isometric view depicting a digital information appliance having an integrated power adapter and thermal cooling assembly in accordance with a second exemplary embodiment of the present invention.
Figure 16:
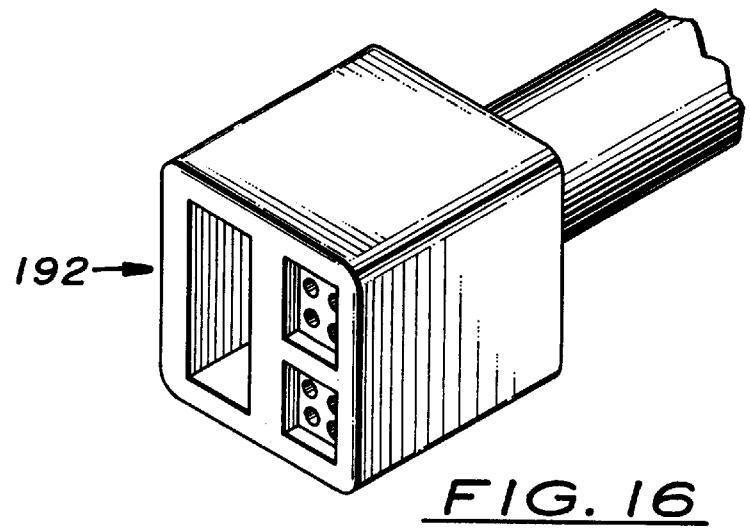
FIG. 16 is an isometric view depicting a digital information appliance system having an integrated power adapter and thermal cooling assembly in accordance with a third exemplar embodiment of the present invention.

In one embodiment, the digital information appliance 102 comprises a portable computer, commonly referred to in the art as a "laptop" or "notebook" computer. As shown in FIGS. 1, 14, and 16, such a digital information appliance 102 may include a housing 108 having a main housing portion 10 containing a keyboard and electronic components such as a processor, memory, bus, input/output devices, and the like, and a lid portion 112 including a display. The lid portion 112 is pivotally hinged to the main housing portion 110 so that the lid portion 112 and processor portion 110 may be folded together for storage and transport. However, it should be appreciated that while a portable computer is shown herein, use of the present invention in other types of digital information appliances including, but not limited to, Internet appliances, personal digital assistants (PDAs), desktop personal computer systems, and servers, is anticipated.

Figure 2:
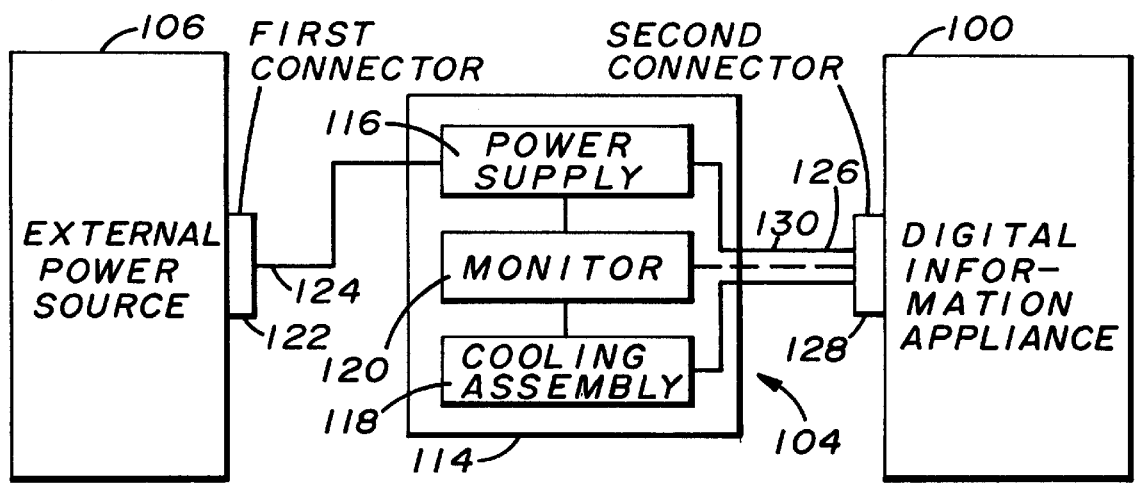
FIG. 2 is a block diagram of the power adapter shown in FIG. 1.

Referring now to FIGS. 1 and 2, an exemplary power adapter having a thermal cooling assembly in accordance with the present invention is described. The power adapter 104 includes a housing 114 including a power supply 116, the thermal cooling assembly 118, and optionally a power/cooling monitor 120. The housing 114 is coupled to an external power source 106 via a first connector 122 and power cord 124 and the digital information appliance via a coupling assembly 126 comprising a second connector 128 and conduit assembly 130. Alternately, the power cord 124 may be eliminated, such that the first connector is mounted directly to the housing 114 and supports the housing 114 while coupled to the external power source 106 (e.g., while plugged into a wall outlet as shown in FIG. 1).

The power supply 116 provides conditioned electrical power to the digital information appliance 102 from an external source 106. In one embodiment the power supply 116 may convert alternating current (AC) electrical power from an external AC power source to direct current (DC) electrical power suitable for use by said digital information appliance 102. For instance, as shown in FIG. 1, the power supply 104 may be coupled to a conventional wall outlet providing 110 or 220 VAC domestic electric supply via the first connector 122 (e.g., an AC power plug) and power cord 124. The power supply may convert the 110 or 220 VAC supply to low-voltage direct current (DC), suitable for operating solid-state electronic components of the digital information appliance 102 and/or to charge the digital information appliance's internal battery.

Alternately, the power supply may regulate direct current (DC) electrical power having a first voltage level to direct current (DC) electrical power having a second voltage level suitable for use by the digital information appliance 102. For example, the power supply may be coupled to an automobile electrical system supplying 12 volt direct current (DC) via a "cigarette lighter" adapter. The power supply may then regulate the 12 volt DC power to low-voltage direct current (DC) of a different voltage, typically 5 to 12 volts, suitable for the digital information appliance 102.

The thermal cooling assembly 118 provides supplemental cooling to the digital information appliance 102 while the power adapter 104 is operably coupled thereto by the coupling assembly 126. Further, the thermal cooling assembly may provide cooling to the power supply 116 within the power adapter housing 114. In an exemplary embodiment, cooling is provided via a cooling medium circulated through the digital information appliance's housing 108 by the thermal cooling assembly 118 via conduit assembly 130.

The power/cooling monitor may regulate the amount of cooling being provided to the digital information appliance 102 by the thermal cooling assembly 118 based on the amount of power provided or a sensed temperature within the digital information appliance 102. In this manner, the thermal cooling assembly 118 may be operated only when supplemental cooling is required. Thus, no additional mechanical operations are required to activate or deactivate the thermal cooling assembly 118 to provide supplemental cooling to the digital information appliance 102.

In an exemplary embodiment, the power/cooling monitor 120 may determine, via a feedback loop, whether the digital information appliance 102 is turned on or off. Similarly, the digital information appliance 102 may include a processor capable of operation in a high power mode, requiring a greater amount of cooling, and a low power mode, requiring a lesser amount of cooling. Thus, the power/cooling monitor 120 may further determine whether the processor is operating in high or low power mode. The power/cooling monitor 120 may then turn the thermal cooling assembly 118 on or off and adjust the amount of cooling it provides accordingly. For example, when the user leaves the power adapter 104 attached to the digital information appliance 102 while it is turned off, the power/cooling monitor 120 may sense that power is not being delivered by the power supply 116. The power/cooling monitor 120 may then shut off the thermal cooling assembly 118. Similarly, wherein power/cooling monitor 120 senses that the power supply 116 is delivering maximum output power, it causes the thermal cooling assembly to output maximum cooling to the digital information appliance 102.

Alternatively, the power/cooling monitor 120 may be simplified or eliminated such that the thermal cooling assembly 118 may operate continuously when the power adapter 104 is coupled to the digital information appliance 102. For instance, the thermal cooling assembly 118 may self-activate when the power adapter 104 is coupled to the digital information appliance 102 and self-deactivate only when the power adapter 104 is uncoupled from the digital information appliance 102 or when it is disconnected from the external power source 106.

Figure 3:
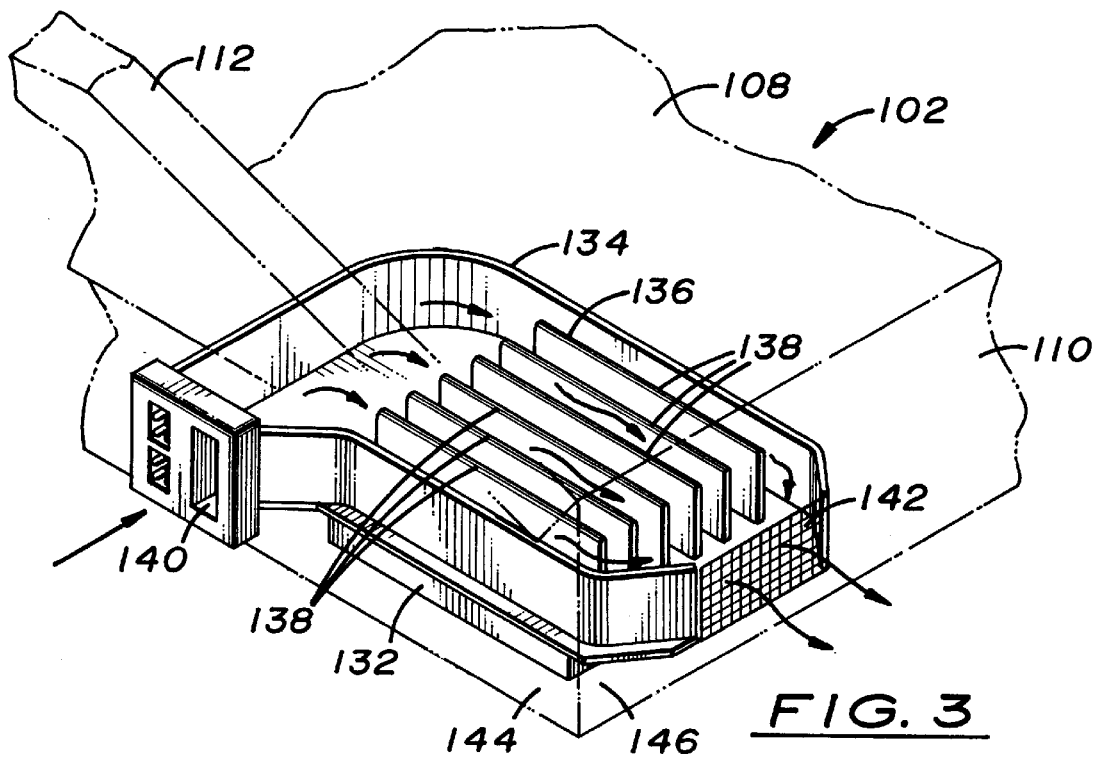
FIG. 3 is a phantom isometric view of the digital information appliance shown FIG. 1, further illustrating a heat dissipation assembly for dissipating heat from the appliance's internal electronic components.

As shown in FIGS. 1, 2 and 3, in one embodiment, the cooling medium may be comprised of air drawn from the surrounding environment and circulated through the housing 108 of the digital information appliance 102 by the cooling assembly 118. In this embodiment, the thermal cooling assembly 118 may be comprised of an air pump or cooling fan capable of forcing ambient air through the cooling medium conduit of the conduit assembly 130 and second connector 128 where it is circulated through a heat dissipation assembly (see FIG. 3) within the digital information appliance 102. Alternately, the thermal cooling assembly 118 may draw ambient air through the digital information appliance housing 108, second connector 128, and cooling medium conduit of the coupling assembly 126 where it is discharged from the housing 114 of the power adapter 104. Heat generated by electrical or electronic components 132 (FIG. 3), such as a processor, contained within the digital information appliance 102 is transferred to the heat dissipation assembly where it is dissipated to the cooling medium via convection. Alternately, the thermal cooling assembly 118 may further comprise a refrigeration system for cooling the air before it is provided to the digital information appliance 102. Use of refrigerated air may be necessary where uncooled, ambient air is inadequate to properly cool the digital information appliance 102, for instance, when the digital information appliance 102 employs components generating extreme amounts of heat, or when the temperature of the ambient air is too high to provide sufficient cooling.

Referring now to FIG. 3, an exemplary heat dissipation assembly is described wherein either ambient or refrigerated air is used for cooling one or more electrical components of the digital information appliance. The heat dissipation assembly is preferably comprised of an air chamber or cowling 134 mounted within the housing 108 of the digital information appliance 102 (e.g., the main housing portion 110 of a portable computer). A heat sink 136 is disposed within the air chamber 134. During operation of the digital information appliance 102 wherein supplemental cooling is provided by the thermal cooling assembly 118 (FIGS. 1 and 2), air enters the air chamber 134 via a first or "input" port 140. The air flows though the air chamber 134 and over the fins of heat sink 138 so heat generated by electrical or electronic components 132, such as a processor, may be dissipated via convection. The air then exits the air chamber 134 via a second or "exhaust" port 142. Alternately, ambient air may be drawn through the air chamber 134 via the exhaust port 142 via a vacuum created by the thermal cooling assembly 118.

In one embodiment shown in FIG. 3, wherein the digital information appliance 102 is a portable computer, the air chamber 134 may be located in one corner of the portable computer's main housing portion 110. In this manner, the input port 140 may be positioned on the housing portion's back surface 144 while the exhaust port 142 is position on a side surface 146 to provide an efficient air flow path through the air chamber 134. However, it should be appreciated that the actual configuration of the air chamber 134 may be altered based on design considerations of the digital information appliance 102. Further, while the use of an air chamber, such as air chamber 134 described herein, provides an efficient air flow path over the fins 138 of heat sink 136 and therefor provides for efficient cooling of electric components, it is not necessary that such an air chamber be used. Instead, air may be blown or drawn through the digital information appliance's housing 108 so that it flows over the fins 138 of heat sink 136 or the electronic component itself. However, since electric components within many digital information appliances such as the portable computer described herein, are generally somewhat crowded to conserve space, such a configuration may be less efficient.

The heat sink 136 is thermally coupled to one or more electrical or electronic components, such as a processor, within the housing 108 of digital information appliance 102. The heat sink 136 absorbs heat from the electrical components and dissipates this heat to the cooling medium. For instance, in one embodiment shown in FIG. 3, the heat sink 136 may be physically attached to the component 132. Alternately, one or more electrical or electronic components 132 may be mounted to a thermally conductive plate that is in turn coupled to the heat sink (see FIG. 7). In this way, heat generated by the components 132 may be transferred to the heat sink 136 via conduction and then dissipated via convection to the cooling medium. In yet another embodiment, the electronic component may be coupled to the heat sink 136 via a heat pipe (not shown) having a hot end, wherein heat is transferred to the heat pipe from the electric component, and a cold end, wherein heat is transferred to the heat sink 136 to be dissipated to the cooling medium. Such a heat pipe may be comprised of a sealed tube containing a liquid and a wick. When heat is transferred to the heat pipe from the electric component, the liquid evaporates at the hot end. The vapor formed by evaporation of the liquid spreads along the tube to the cold end where it condenses onto the wick and flows back along the wick to the hot end by capillary action. This evaporation and condensation of the liquid allows heat generated by the electric component at the hot end to be transferred the cold end where it may be dissipated to the cooling medium.

As shown in FIGS. 1 and 2, the coupling assembly 126 provides electrical power from the power supply 116 and cooling from the thermal cooling assembly 118 to the digital information appliance. The coupling assembly 126 may be comprised of conduit assembly 130 extending from the housing 114 of the power adapter 104 and terminated in a second connector 128 suitable for providing attachment of the power adapter 104 to the digital information appliance 102.

Referring now to FIGS. 4A, 4B, 5A, 5B, 6A, and 6B, exemplary conduit assemblies 130 suitable for use with the digital information appliance system of FIGS. 1 through 3 are described. The conduit assembly 130 includes power and ground wires 148 & 150 for providing electrical power from the power supply 116 to the digital information appliance 102. Optionally, signal wires 152 & 154 (FIGS. 4A, 4B, 5A and 5B) may also be provided to provide a feedback loop from the digital information appliance 102 to the power/cooling monitor 120 within the power adapter 104. This feedback loop allows the power/cooling monitor 120 to monitor and optionally regulate the amount of electrical power provided to the digital information appliance 102 by the power supply 116 and regulate the amount of cooling provided to the digital information appliance 102 by the thermal cooling assembly 118. Alternately, such a feedback loop may be provided via power 148 and ground wires 150 (FIGS. 6A and 6B) utilizing a suitable communication protocol such as X10 or the like.

In accordance with the present invention, the conduit assembly 130 further includes at least one cooling medium conduit 156. The cooling medium conduit 156 transfers the cooling medium, air, between the thermal cooling assembly 118 and the second connector 128 where it is provided to the digital information appliance 102.

Figure 4A:
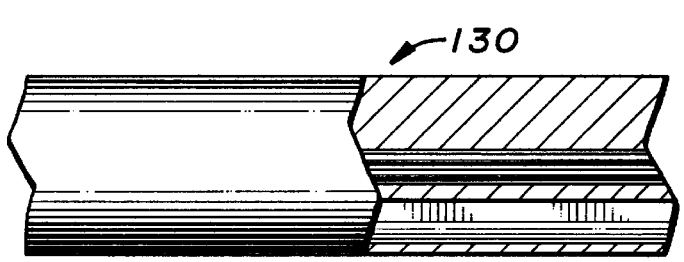
FIGS. 4A and 4B are cross-sectional views illustrating an exemplary conduit assembly which may be employed by the power adapter to provide electrical power and cooling to the digital information appliance shown in FIG. 3.
Figure 4B:
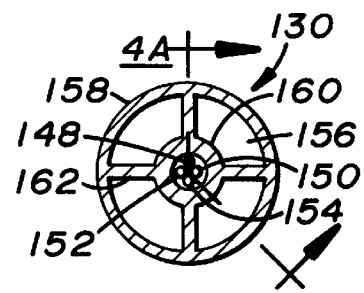
Figure 5A:
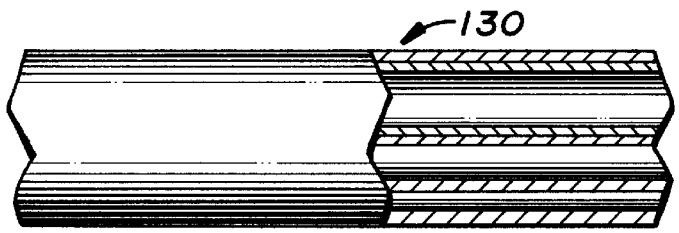
FIGS. 5A and 5B are cross-sectional views illustrating an exemplary conduit assembly which may be employed by the power adapter to provide electrical power and cooling to the digital information appliance shown in FIG. 3.
Figure 5B:
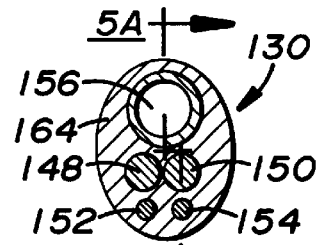
Figure 6A:
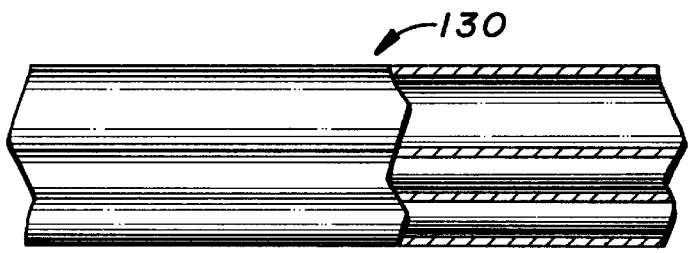
FIGS. 6A and 6B are cross-sectional views illustrating an exemplary conduit assembly which may be employed by the power adapter to provide electrical power and cooling to the digital information appliance shown in FIG. 3.
Figure 6B:
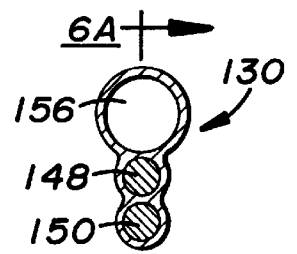

The conduit assembly 130 may have a wide variety of configurations depending on specific design considerations. Three such configurations are shown in FIGS. 4A, 4B, 5A, 5B, 6A, and 6B. In FIGS. 4A and 4B, a conduit assembly 130 is shown wherein the electrical cable 158 containing power wire 148, ground wire 150 and signal wires 152 & 156, is held coaxially within the coolant medium conduit 156. Supports 160 may be provided to prevent the cooling medium conduit from being crushed against the electrical cable 158 thereby obstructing flow of the cooing medium. Alternately, as shown in FIGS. 5A and 5B, the power, ground and optional signal lines 148, 150, 152 & 154 and cooling medium conduit may be encased in a sheath or jacket 156 or, as shown in FIGS. 6A and 6B, attached together. It should be appreciated, however, that the configurations shown are exemplary only, and are not exhaustive of all configurations possible.

Figure 7:
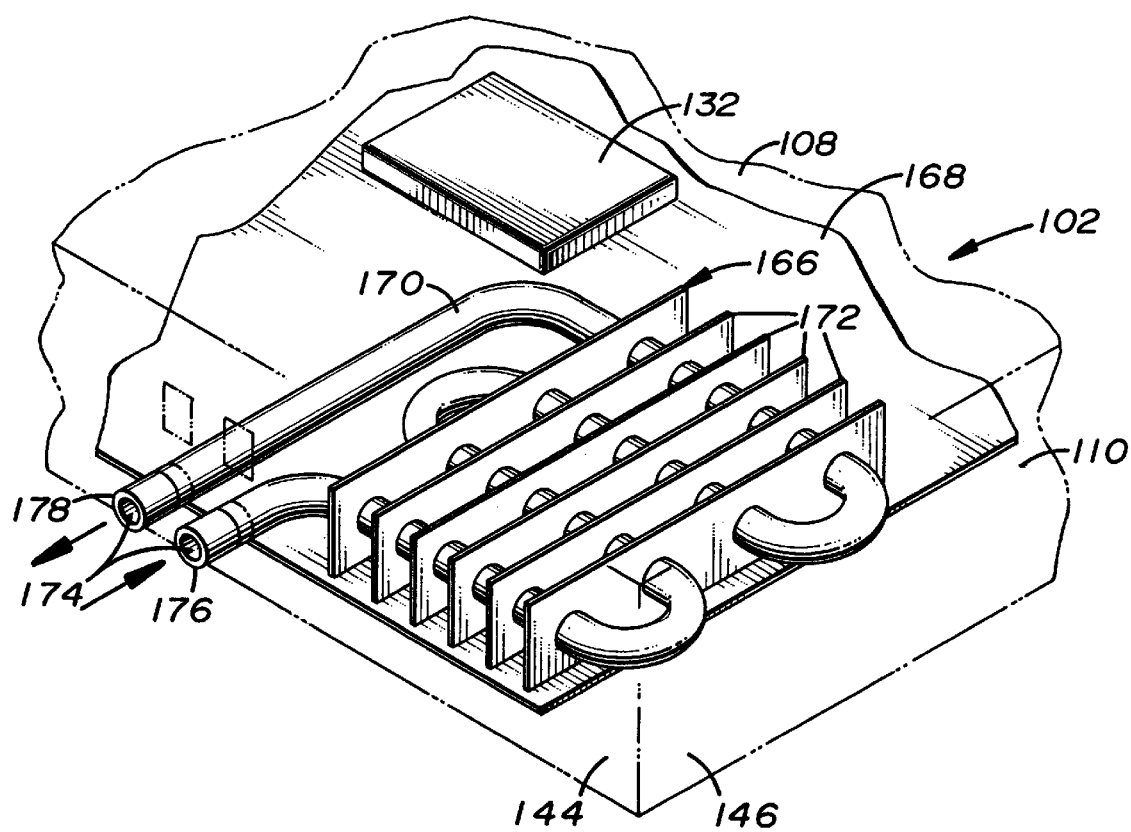
FIG. 7 is a phantom isometric view of the digital information appliance shown in FIG. 1, utilizing a closed coolant system and further illustrating a heat dissipating assembly for dissipating heat from the appliance's internal electronic components to the coolant.
Figure 8:
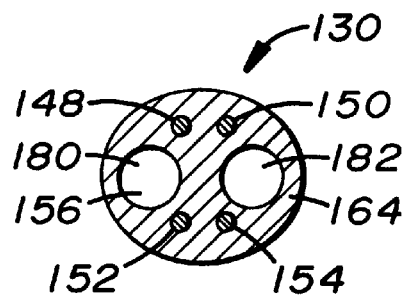
FIGS. 8 is a cross-sectional view illustrating an exemplary conduit assembly which may be employed by the power adapter to provide electrical power and cooling to the digital information appliance shown in FIG. 7.
Figure 9A:
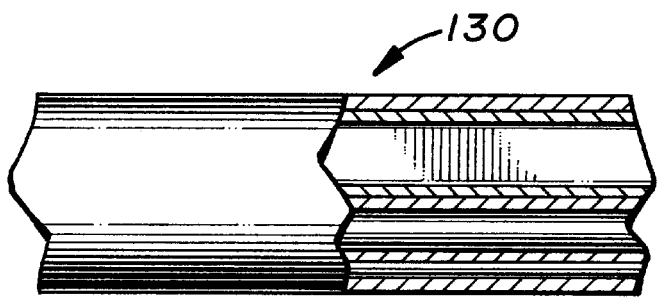
FIGS. 9A and 9B are cross-sectional views illustrating an exemplary conduit assembly which may be employed by the power adapter to provide electrical power and cooling to the digital information appliance shown in FIG. 7.
Figure 9B:
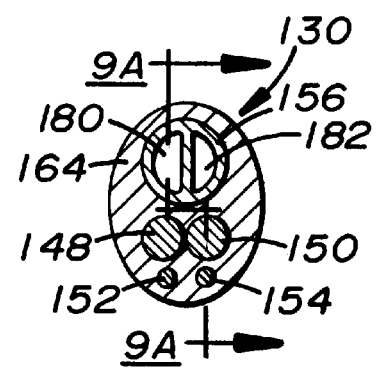
Figure 10A:
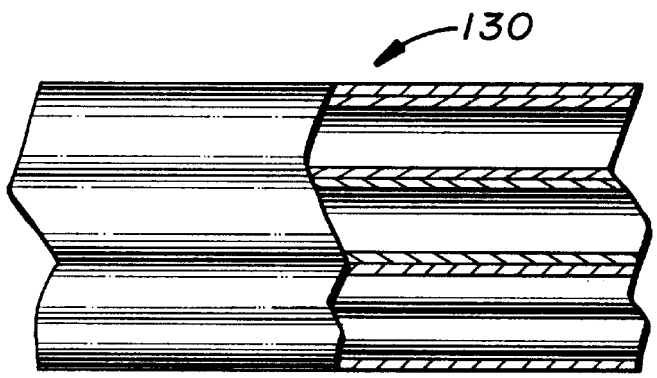
FIGS. 10A and 10B are cross-sectional views illustrating an exemplary conduit assembly which may be employed by the power adapter to provide electrical power and cooling to the digital information appliance shown in FIG. 7.
Figure 10B:
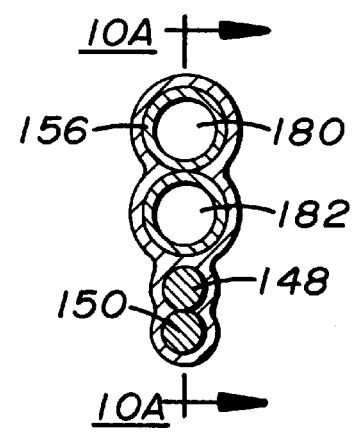

Referring now to FIGS. 1, 2 and 7, in an exemplary embodiment, the cooling medium may alternately be a gas or liquid coolant circulated between the thermal cooling assembly 118 and the digital information appliance 102 within a closed system. In such an embodiment, the thermal cooling assembly 118 includes a pump for pumping coolant through a heat dissipation assembly within digital information appliance 102. Heat generated by electrical and electronic components, such as processor (FIG. 7), contained within the digital information appliance 102 is transferred to the heat dissipation assembly where it is dissipated to the coolant via conduction. The coolant is then returned to the thermal cooling assembly where the excess heat is dissipated.

Referring now to FIG. 7, an exemplary heat dissipation assembly is described for a closed coolant system wherein a coolant is used for cooling one or more electrical components of the digital information appliance. The heat dissipation assembly is preferably comprised of a heat sink 166 mounted within the housing 108 of the digital information appliance 102 (e.g., the main housing portion 110 of a portable computer). Coolant is circulated through the heat sink 166 by the thermal cooling assembly 118 (FIGS. 1 and 2) within a coil or tube 168 passing through fins 170. Fins 170 are thermally coupled to one or more electrical or electronic components 132, such as a processor, within the housing 108 of digital information appliance 102. For instance, one or more electrical or electronic components 132 may be mounted to a thermally conductive plate 172 that is in turn physically coupled to the fins 170 of heat sink 166. The plate 172 absorbs heat from the electrical components and transfers the heat to the heat sink 166 where it may be transferred to coolant flowing through the coil 168 via conduction through fins 170. Alternately, the heat sink 166 may be physically attached to an electrical or electronic component 132 such as a processor, or the component 132 may be coupled to the heat sink 166 via a heat pipe as discussed supra.

Input and return ports 174 & 176 are provided for coupling the coil 168 to connector 128 of the power adapter 104 so that coolant may flow between the thermal cooling assembly 118 and the coil 168. During operation of the digital information appliance 102 wherein supplemental cooling is provided by the thermal cooling assembly 118 (FIGS. 1 and 2), coolant enters the coil 168 via input port 174 and is circulated through the coil. The air then exits the coil 176 via return port 176. Self-sealing couplings 178, such as conventional pressure couplings or the like, prevent loss of coolant when the power adapter 104 is disconnected from the digital information appliance 102.

Referring now to FIGS. 8, 9A, 9B, 10A and 10B, exemplary conduit assemblies 130 suitable for use in closed coolant systems such as discussed, supra, are described. Like the conduit assemblies shown in FIGS. 4A through 6B, conduit assemblies 130 shown in FIGS. 8 through 10B, include power and ground wires 148 & 150 for providing electrical power from the power supply 116 to the digital information appliance 102 and, optionally, signal wires 152 & 154 (FIGS. 8, 5A and 5B) for providing a feedback loop from the digital information appliance 102 to the power/cooling monitor 120 within the power adapter 104. The cooling medium conduit 156 preferably includes pressure and return ducts 180 & 182 for providing coolant to the coil 168 from the thermal cooling assembly 118 and returning coolant to the thermal cooling assembly once circulated through the coil 168. As shown in FIGS. 5A and 5B, the power, ground and optional signal lines 148, 150, 152 & 154 and cooling medium conduit may be encased in a sheath or jacket 156, or, as shown in FIGS. 6A and 6B, attached together.

As discussed, supra, the conduit assembly 130 may have a wide variety of configurations depending on specific design considerations. Thus, while three exemplary configurations are shown herein in FIGS. 8 through 10B, it should be appreciated that these configurations are exemplary only, and are not exhaustive of all configurations possible.

Figure 11:
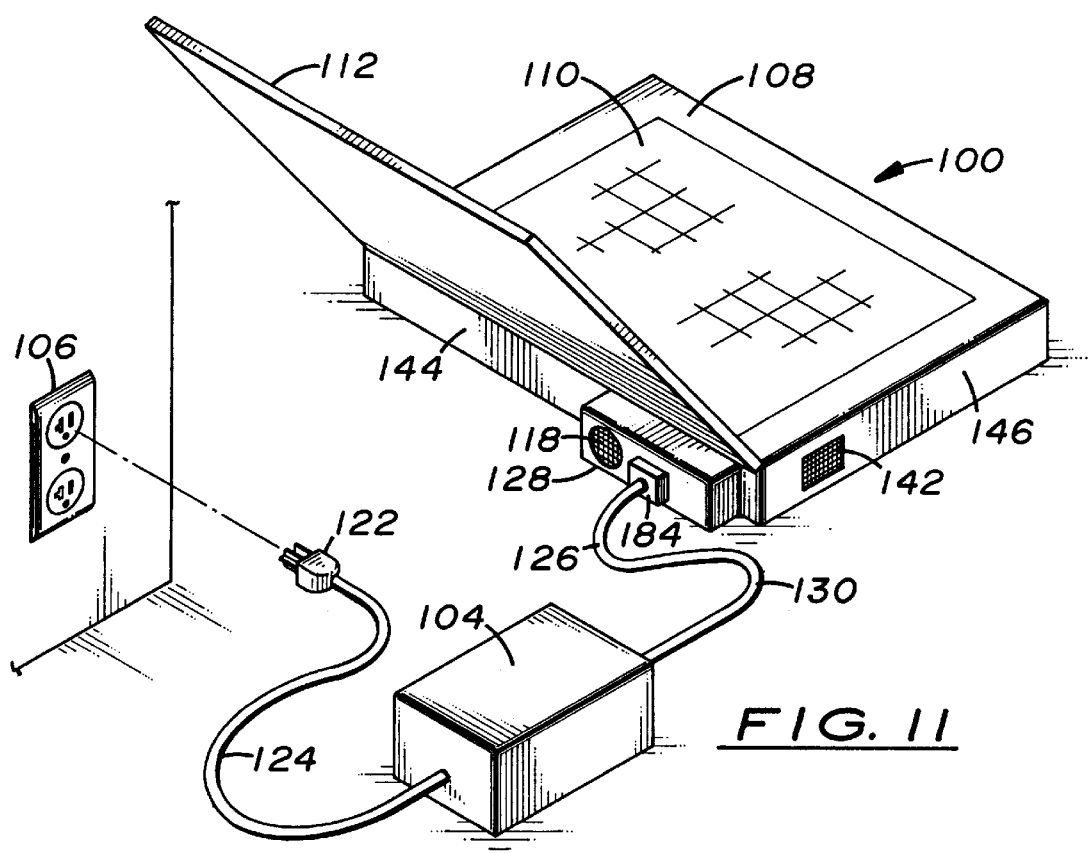
FIGS. 11, 12 and 13 are isometric views illustrating exemplary connector configurations for coupling the power adapter to the digital information appliance.
Figure 12:
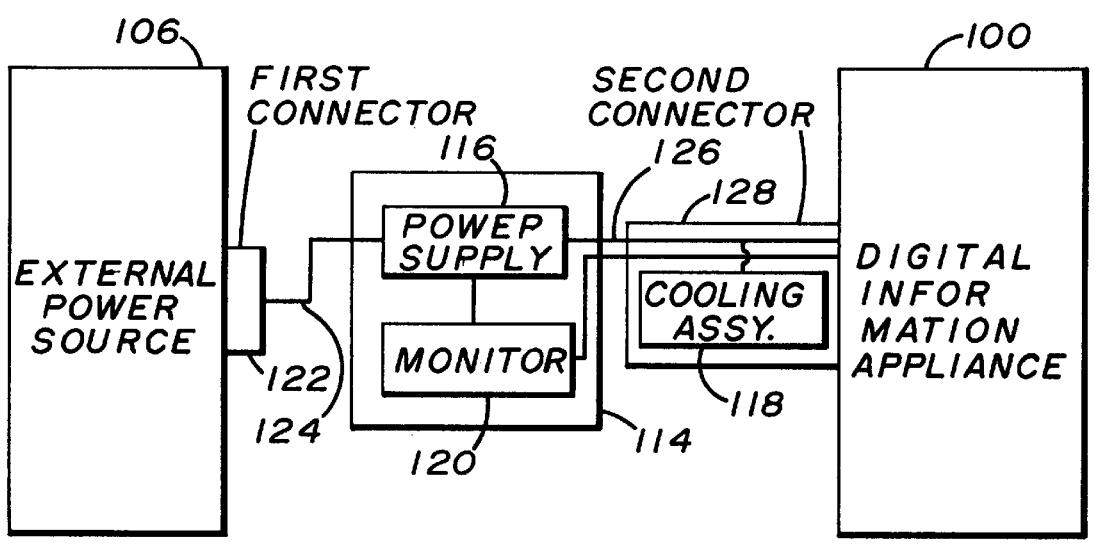
Figure 13:
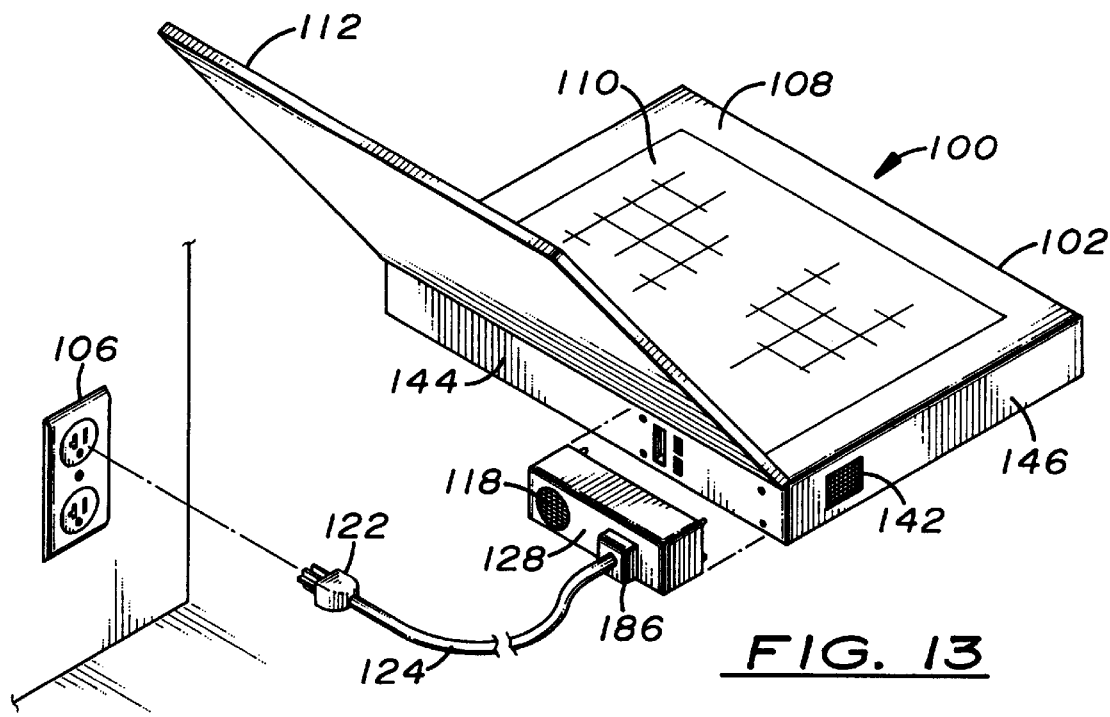

Referring now to FIGS. 11, 12, and 13, exemplary connectors suitable for coupling the power adapter to the digital information appliance are shown. Connectors 128 are configured to mate with a corresponding connector of the digital information appliance 102 to interface electrical power, cooling, and optionally power/cooling control signals between digital information appliance 102 and the power adapter 104 (see FIGS. 3 and 7). In exemplary embodiments, each connector 128 includes a power interface, such as contacts 192 (FIG. 11) or pin assemblies 194 (FIGS. 12 and 13) coupled to power and ground lines of cable 130 for supplying conditioned electrical power from the power supply 114 to the digital information appliance 102 (FIGS. 1, 14 and 16). Similarly an interface, such as pin assembly 196 (FIGS. 12 & 13) may also be provided for signal lines utilized to provide a feedback loop to power/cooling monitor 120 (FIG. 2). A cooling medium interface such as port 198 (FIG. 11), port 200 (FIG. 12), or pressure couplings 202 & 204 interfaces the cooling medium conduit of cable 130 with a corresponding port or pressure couplings of the digital information appliance's housing to supply the cooling medium to the heat dissipation assembly within the digital information appliance.

Turning now to FIGS. 14 through 17, embodiments of the present invention are shown wherein the thermal cooling assembly is placed within the second connector instead of the power adapter's housing as shown in FIGS. 1 and 2.

Figure 15:
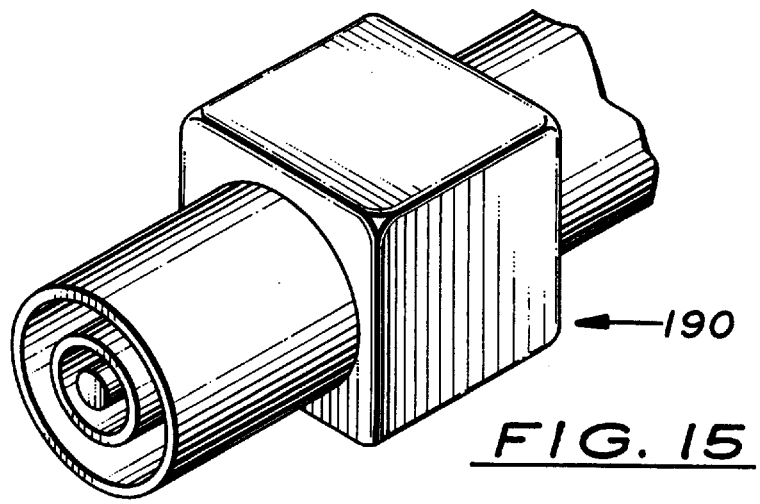
FIG. 15 is a block diagram of the power adapter shown in FIG. 14.

In one such embodiment, shown in FIGS. 14 and 15, the power adapter 104 includes a housing 114 including power supply 116 and optionally power/cooling monitor 120. The housing 114 is coupled to an external power source 106 via a first connector and power cord 124 and the digital information appliance via a coupling assembly 126 comprising a second connector 128 and cable 130. Thermal cooling assembly 118 is housed within the second connector 128 so that it is attached directly to the digital information appliance's housing by connector 128 eliminating the need for a cooling medium conduit in cable 130. As shown in FIG. 14, an electrical connector 184 disposed on the end of cable 130 may couple the power supply 116 contained with the power adapter housing 114 to the second connector 128 to provide electrical power to the thermal cooling assembly 118 and digital information appliance 102.

Figure 17:
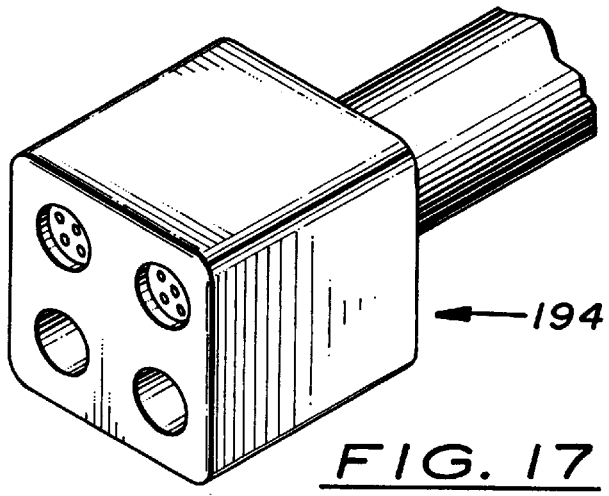
FIG. 17 is a block diagram of the power adapter shown in FIG. 16.

In an additional embodiment shown in FIGS. 16 and 17, the power adapter housing 114 maybe completely eliminated. Thus, the power supply 114, thermal cooling assembly 118, and optionally power/cooling monitor 120 are housed in connector 128 and attached directly to the digital information appliance's housing 108. An electrical connector 186 may be provided for attaching power cord 124 to the power supply 116 so that the power supply 116 may be coupled to external power source 106.

As shown in FIGS. 1 and 16, additional fastening devices 188 such as thumb screw fastener assemblies, spring clip fasteners, and the like may be utilized to secure the enlarged connector 128 to the back surface 144 of housing portion 110.

By utilizing electronic components such as processors that may switch between a low power mode and a higher power mode of operation and providing supplemental cooling, internal cooling apparatus such as heat sinks, cooling fans and the like within the digital information appliance may be made smaller or eliminated entirely. As a result, digital information appliance systems employing the present invention may be made to consume less power, weight less than their conventional counterparts and have a slimmer, more compact shape. The present invention further allows the thermal cooling assembly 118 to be remotely located from the digital information appliance 102 (e.g., on the floor adjacent to a table or desk supporting the digital information device 102 as shown in FIG. 1). Such remote location allows the digital information appliance to operate more quietly.

It is believed that the power adapter of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An external power adapter for a digital information appliance, comprising:

a power supply for conditioning electrical power supplied to the digital information appliance from an external source;

a thermal cooling assembly for providing cooling to said digital information appliance by circulating a cooling medium through said digital information appliance; and a coupling assembly capable of operably coupling said power adapter to said digital information appliance;

wherein said coupling assembly provides a conduit for circulating the cooling medium between said thermal cooling assembly and said digital information appliance while said power adapter is operably coupled to said digital information appliance by said coupling assembly.

2. The power adapter as claimed in claim 1, further comprising:

a housing for containing said power supply and said thermal cooling assembly; and a connector assembly for coupling said power supply to said external power source to provide unconditioned electrical power to said power supply.

3. The power adapter as claimed in claim 1, wherein said coupling assembly comprises a connector assembly suitable for connecting said coupling assembly to said digital information appliance and wherein said thermal cooling assembly is disposed in said connector assembly.

4. The power adapter as claimed in claim 1, further comprising a cooling regulator for monitoring the amount of electrical power provided to the digital information appliance and regulating the amount of cooling being provided to the digital information appliance based on the amount of power provided.

5. The power adapter as claimed in claim 1, wherein said coupling assembly comprises:

a power cable for providing conditioned electrical power to said digital information appliance;

a ground cable for providing a ground to said digital information appliance; and at least one coolant flow tube for transferring said cooling medium between said thermal cooling assembly and said digital information appliance to provide cooling thereto.

6. The power adapter as claimed in claim 5, wherein said cooling medium is a gas.

7. The power adapter as claimed in claim 6, wherein said cooling medium is air.

8. The power adapter as claimed in claim 5, wherein said thermal cooling assembly comprises a closed refrigerant system and said cooling medium is a refrigerant.

9. The power adapter as claimed in claim 1, wherein conditioning of electrical power by said power supply comprises converting alternating current (AC) electrical power from said external source to direct current (DC) electrical power suitable for use by said digital information appliance.

10. The power adapter as claimed in claim 1, wherein conditioning of electrical power by said power supply comprises regulating direct current (DC) electrical power having a first voltage level to direct current (DC) electrical power having a second voltage level suitable for use by said digital information appliance.

11. The power adapter as claimed in claim 1, further comprising: a housing for containing said power supply; and a first connector assembly for coupling said power supply to said external power source to provide alternating current (AC) electrical power to said power supply;

wherein said power supply is suitable for conditioning said alternating current (AC) electrical power by converting said alternating current (AC) electrical power to direct current (DC) electrical power suitable for use by said digital information appliance; and wherein said coupling assembly comprises a second connector assembly suitable for connecting said coupling assembly to said digital information appliance to provide direct current (DC) electrical power to said digital information appliance.

12. The power adapter as claimed in claim 11, wherein said thermal cooling assembly is disposed in said housing.

13. The power adapter as claimed in claim 11, wherein said coupling assembly further comprises:

a power cable for providing conditioned electrical power to said digital information appliance;

a ground cable for providing a ground to said digital information appliance; and at least one coolant flow tube for transferring a cooling medium between said thermal cooling assembly and said digital information appliance to provide cooling thereto.

14. The power adapter as claimed in claim 11, wherein said thermal cooling assembly is disposed in said second connector.

15. A digital information appliance system, comprising:

a digital information appliance having a housing and at least one electronic component disposed within said housing;

an external power adapter suitable for being operably coupled to said digital information appliance, said power adapter further comprising:

a power supply suitable for conditioning electrical power supplied to the digital information appliance from an external source for powering said electronic component;

a thermal cooling assembly; and a coupling assembly capable of operably coupling said power adapter to said housing;

wherein said thermal cooling assembly is suitable for providing cooling to said electronic component by circulating a cooling medium through said housing via said coupling assembly while said power adapter is operably coupled to said digital information appliance by said coupling assembly.

16. The digital information appliance system as claimed in claim 15, further comprising a cooling regulator for monitoring the amount of electrical power provided to the digital information appliance and regulating the amount of cooling being provided to the digital information appliance based on the amount of power provided.

17. The digital information appliance system as claimed in claim 15, wherein said digital information appliance further comprises a heat dissipation assembly disposed in said housing capable of absorbing and dissipating heat generated by said electronic component.

18. The digital information appliance system as claimed in claim 15, wherein conditioning of electrical power by said power supply comprises regulating direct current (DC) electrical power having a first voltage level to direct current (DC) electrical power having a second voltage level suitable for use by said digital information appliance.

19. The digital information appliance system as claimed in claim 15, wherein said coupling assembly comprises:

a power cable for providing conditioned electrical power to said digital information appliance;

a ground cable for providing a ground to said digital information appliance; and at least one coolant flow tube for transferring said cooling medium between said thermal cooling assembly and said heat dissipation assembly to provide cooling to said electronic component.

20. The digital information appliance system as claimed in claim 19, wherein said cooling medium is a gas.

21. The digital information appliance system as claimed in claim 20, wherein said cooling medium is air.

22. The digital information appliance system as claimed in claim 19, wherein said thermal cooling assembly comprises a closed refrigerant system and said cooling medium is a refrigerant.

23. The digital information appliance system as claimed in claim 15, further comprising:

a power adapter housing for containing said power supply; and a connector assembly for coupling said power supply to said external power source to provide unconditioned electrical power to said power supply;

wherein said thermal cooling assembly is disposed in said housing.

24. The digital information appliance system as claimed in claim 15, wherein said coupling assembly comprises a connector assembly suitable for connecting said coupling assembly to said housing and wherein said thermal cooling assembly is disposed in said connector assembly.

25. The digital information appliance system as claimed in claim 15, wherein conditioning of electrical power by said power supply comprises converting alternating current (AC) electrical power from said external source to direct current (DC) electrical power suitable for use by said digital information appliance.

26. The digital information appliance system as claimed in claim 15, further comprising:

a housing for containing said power supply; and a first connector assembly for coupling said power supply to said external power source to provide alternating current (AC) electrical power to said power supply;

wherein said power supply is suitable for conditioning said alternating current (AC) electrical power by converting said alternating current (AC) electrical power to direct current (DC) electrical power suitable for use by said digital information appliance; and wherein said coupling assembly comprises a second connector assembly suitable for connecting said coupling assembly to said digital information appliance to provide direct current (DC) electrical power to said digital information appliance.

27. The digital information appliance system as claimed in claim 26, wherein said thermal cooling assembly is disposed in said second connector assembly.

28. The digital information appliance system as claimed in claim 26, wherein said thermal cooling assembly is disposed in said housing.

29. The digital information appliance system as claimed in claim 28, wherein said coupling assembly further comprises:

a power cable for providing conditioned electrical power to said digital information appliance;

a ground cable for providing a ground to said digital information appliance; and at least one cooling medium conduit for transferring a cooling medium between said thermal cooling assembly and said digital information appliance to provide cooling thereto.

30. A power adapter for a digital information appliance, comprising:

a housing external to said digital information appliance;

a power supply disposed in said housing for conditioning electrical power supplied to the digital information appliance from an external source;

a thermal cooling assembly disposed in said housing for providing cooling to the digital information appliance by circulating a cooling medium through the digital information appliance; and a coupling assembly for operably coupling said power adapter to the digital information appliance;

wherein said coupling assembly provides a conduit for circulating the cooling medium between said thermal cooling assembly and the digital information appliance and for supplying electrical power to the digital information appliance from said power supply.

31. The power adapter as claimed in claim 30, wherein said coupling assembly comprises:

a power cable for providing conditioned electrical power to the digital information appliance;

a ground cable for providing a ground to the digital information appliance; and at least one coolant flow tube for transferring the cooling medium between said thermal cooling assembly and the digital information appliance.

32. An external power adapter for a digital information appliance, comprising:

means for conditioning electrical power supplied to the digital information appliance from an external source;

means for cooling to said digital information appliance by circulating a cooling medium through said digital information appliance while said power adapter is operably coupled thereto by said coupling assembly; and means for operably coupling said external power adapter to said digital information appliance, said coupling means providing a conduit for circulation of the cooling medium between the cooling means and the digital information appliance.

33. The power adapter as claimed in claim 32, further comprising means for coupling said power supply to said external power source to provide unconditioned electrical power to said power supply.

34. The power adapter as claimed in claim 32, further comprising means for monitoring the amount of electrical power provided to the digital information appliance and regulating the amount of cooling being provided to the digital information appliance based on the amount of power provided.

35. The power adapter as claimed in claim 32, wherein said cooling medium is a gas.

36. The power adapter as claimed in claim 35, wherein said cooling medium is air.

37. The power adapter as claimed in claim 32, wherein said cooling means comprises a closed refrigerant system and said cooling medium is a refrigerant.

38. The power adapter as claimed in claim 32, wherein conditioning of electrical power by said power supply comprises converting alternating current (AC) electrical power from said external source to direct current (DC) electrical power suitable for use by said digital information appliance.

39. The power adapter as claimed in claim 32, wherein conditioning of electrical power by said power supply comprises regulating direct current (DC) electrical power having a first voltage level to direct current (DC) electrical power having a second voltage level suitable for use by said digital information appliance.

40. A power adapter for a digital information appliance, comprising:

a housing external to said digital information appliance;

a power supply disposed in said housing for conditioning electrical power supplied to the digital information appliance from an external source;

a thermal cooling assembly disposed in said housing for providing cooling to the digital information appliance by circulating a cooling medium through the digital information appliance; and a coupling assembly for operably coupling said power adapter to the digital information appliance, said coupling assembly providing a conduit for circulating the cooling medium between said thermal cooling assembly and the digital information appliance and for supplying electrical power to the digital information appliance from said power supply; and a monitor for monitoring power use by the digital information appliance;

wherein the monitor activates the thermal cooling assembly during periods of high power use for providing supplemental cooling to the information appliance, and deactivates the thermal cooling assembly during periods of low power use.

41. The power adapter as claimed in claim 40, wherein said coupling assembly comprises:

a power cable for providing conditioned electrical power to the digital information appliance;

a ground cable for providing a ground to the digital information appliance; and at least one coolant flow tube for transferring the cooling medium between said thermal cooling assembly and the digital information appliance.

* * * * *